Figure 1:
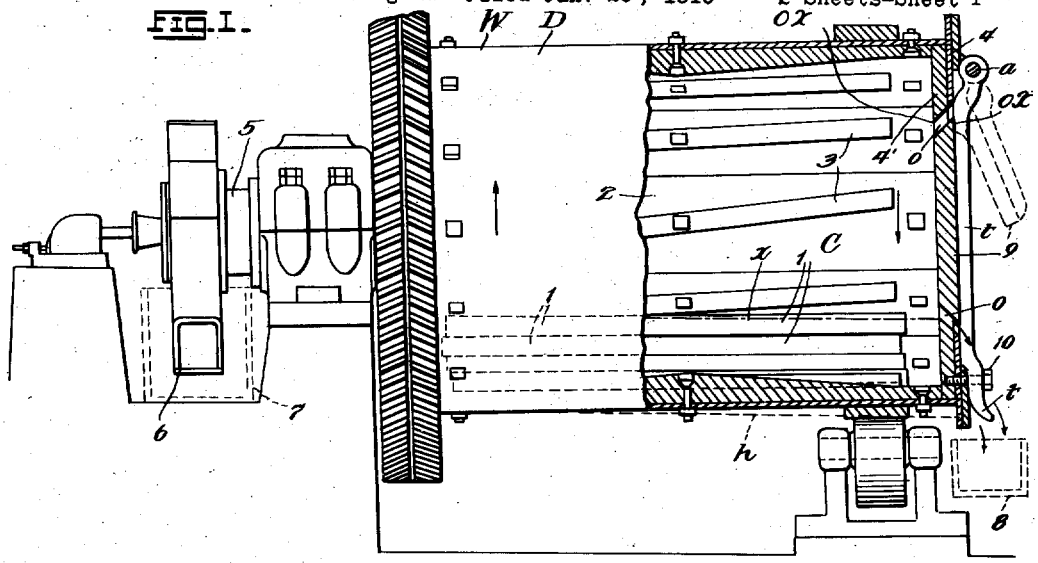

June 5, 1923. Re. 15,620

F. E. MARCY

ROLLER MILL

Original Filed Jan. 25, 1919 2 Sheets-Sheet 1

INVENTOR
Frank E. Marcy
BY
Rogers, Kennedy & Campbell
ATTORNEYS

June 5, 1923. Re. 15,620

F. E. MARCY

ROLLER MILL

Original Filed Jan. 25, 1919 2 Sheets-Sheet 2

INVENTOR
Frank E. Marcy

BY
Rogers, Kenney & Campbell
ATTORNEYS

Reissued June 5, 1923. Re. 15,620

UNITED STATES PATENT OFFICE.

FRANK E. MARCY, OF LOS ANGELES, CALIFORNIA.

ROLLER MILL.

Original application filed January 25, 1919, Serial No. 273,097. Renewed October 13, 1920, Serial No. 416,773. Original No. 1,361,601, dated December 7, 1920. Application for reissue filed November 16, 1922. Serial No. 601,240.

*To all whom it may concern:*

Be it known that I, FRANK E. MARCY, a citizen of the United States, residing at Los Angeles, in the county of Los Angeles and State of California, have invented certain new and useful Improvements in Roller Mills, of which the following is a specification, reference being had to the accompanying drawings, forming a part hereof.

The present invention is directed to improvements in roller (or rod) mills which, as well understood in the art, belong to that class of reducing or disintegrating apparatus wherein the material is reduced by means of freely moving reducing bodies in the form of rods or rollers extended longitudinally substantially the length of the reducing compartment of the mill, the latter being in the form of a suitable tumbling barrel, drum, or equivalent tubular container or treatment vessel rotated about a fixed axis, the opposite ends of the barrel being provided respectively with intake or feed, and discharge openings for the material. The present improvement is concerned with that type of mill in which the discharge end is left open and unobstructed (in contradistinction to the trunnion overflow type of mill) for the passage of the material therethrough and for the purpose of affording access to the interior of the mill at all times, and permitting inspection of its contents at any stage of the reducing operation. A mill of the open end type here referred to is preferably provided with a flange or diaphragm at the point of discharge, said flange serving to build up or raise the pulp line in the mill and thereby permitting the charge of material to be subjected to the reducing action of the rods (or their equivalent) for a somewhat longer period of time than would be the case were the flange dispensed with and the pulp line allowed to drop. It is desirable in a mill of the character referred to, to provide means for preventing the reducing bodies from being projected out of the mill through the open discharge end, or through the available opening defined by the inner or overflow edge of the flange aforesaid; and in the present embodiment of my invention I resort to a suitable rod-intercepting door or guard mounted on the barrel in such a way that while it permits of the free and uninterrupted discharge of the material from the mill, it yet serves as an effective barrier against the projection or precipitation of the reducing bodies from the mill. As intimated above, the guard partakes of the nature of a door which may be manipulated at will so as to uncover the opening partially closed thereby, for purposes of inspection of the mill contents or for the purpose of gaining access to the reducing compartment of the mill at any stage of the reducing operation. The present improvement is characterized mainly by simplicity of construction, and the variety of forms the same may assume without a departure from the basic principle of the invention. The advantages of the improvement will be clearly apparent from the following detailed description in connection with the accompanying drawings in which—

Figure 2:
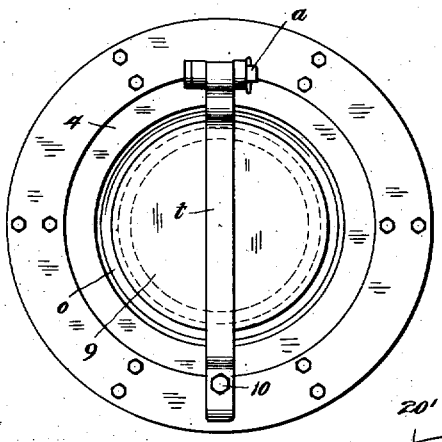
Figure 3:
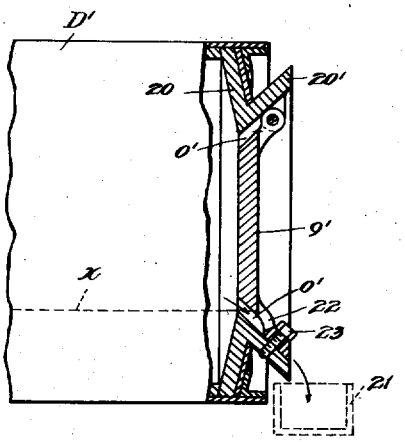
Figure 4:
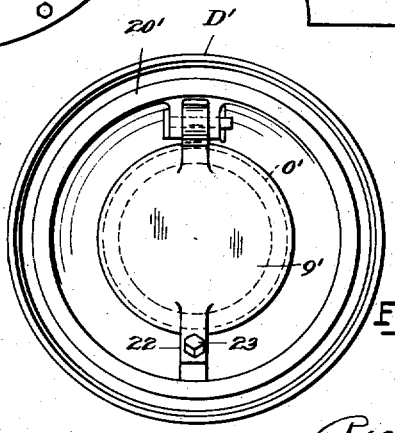
Figure 5:
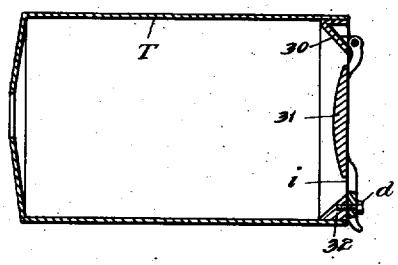
Figure 6:
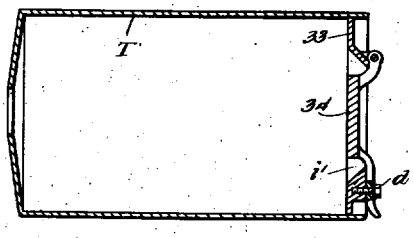
Figure 7:
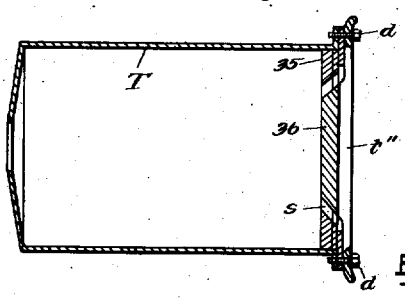
Figure 8:
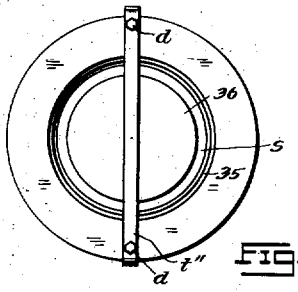
Figure 9:
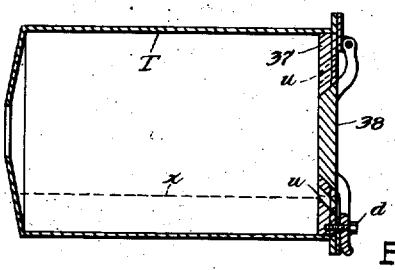
Figure 10:
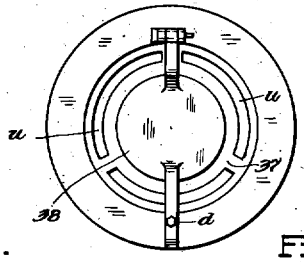
Figure 11:
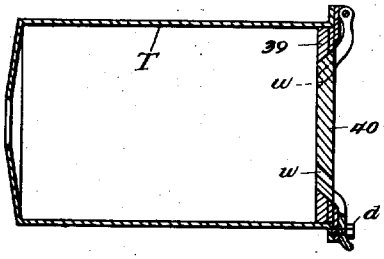
Figure 12:
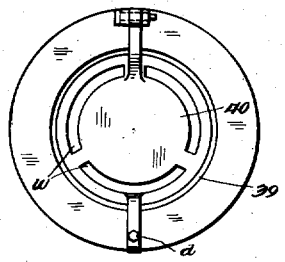

Figure 1 represents a side elevaton of a mill with parts broken away showing one form of my invention applied thereto; Fig. 2 is an end elevation looking toward the discharge end; Fig. 3 is a sectional side elevation of the discharge end of a mill showing another form of my invention; Fig. 4 is an end view of Fig. 3; Fig. 5 is a vertical middle longitudinal section of a mill showing a further modification of my invention; Fig. 6 is a similar view showing a further modification; Fig. 7 is a view similar to Fig. 5 showing another modification; Fig. 8 is an end view of Fig. 7; Fig. 9 is a view similar to Fig. 5 showing a modification in which the discharge slot is formed in the flange at the open end of the mill; Fig. 10 is an end view of Fig. 9; Fig. 11 is a view similar to Fig. 9 showing a modification in which the discharge slot is formed in the door or rod-intercepting member; and Fig. 12 is an end view of Fig. 11.

Referring to the drawings, and for the present to Figs. 1 and 2, D, represents a (preferably) cylindrical container, drum, tumbling barrel or equivalent tubular member, slightly pitched to the horizontal *h*, the reducing compartment C of the mill or barrel containing the usual complement of reducing bodies which in the present example are in the form of longitudinally extended, loose, reducing rods or rollers 1 free to tumble in the barrel as the latter rotates in the reducing operation of the mill, only a portion of the entire complement of rods being herein illustrated. The wall liner 2 is provided with inclined lifters 3 which operate to first lift the reducing rods and then release them in such a way as to cause the rods to tumble or precipitate away from the discharge opening of the mill, the rods being maintained permanently in the reducing compartment C through the combined action of the pitch of the mill, the lifters 3, the flange 4 at the open discharge end of the mill which likewise serves to raise or build up the pulp line, and the guard or rod-intercepting plate or door to which the present improvement is in the main directed. In the present example the mill is provided with a hollow feed or intake trunnion 5 equipped with a conventional scoop feeder 6, which scoops up the pulp from a suitable launder 7, the material discharged from the mill being caught in a launder 8 as well understood in the art.

In the present improvement the guard or rod-intercepting member is carried by the barrel D and assumes the form of a door 9 preferably hinged to the barrel in front of the flange 4, the diameter of the door being smaller than the diameter of the discharge opening defined by the inner edge of the flange, whereby there is formed between the center of the guard and the peripheral wall W of the barrel D, in the present instance between the flange and door an annular slot or passage-way *o* for the discharge of the material from the mill. Since the hinge axis of the door is necessarily located at a point exterior to the periphery of the door, it follows that the continuity of the slot *o* will be interrupted at least at the point where the rib *t* of the door forming one of the elements or leaves of the hinge structure, spans the slot to connect with the hinge pin *a*. In the example before us the rib *t* is likewise extended in the opposite direction across the slot or gap *o*, terminating in an outwardly bent finger-hold *t'* at which point the door is secured to the flange 4 by a cap-screw 10 or in any other suitable mechanical manner. The slot *o* is thus interrupted by the rib *t* at two points; but this interruption in no wise interferes with the free discharge of the pulp from the mill. Preferably, the periphery of the door 9 is made beveled or conical, the cone flaring outwardly, the inner edges of the flange 4 and its liner 4' being given a corresponding slope so that the slot *o* is virtually conical as clearly shown in Fig. 1. The relation of the adjacent edges of the flange and door to each other is such that while an opening is formed through which the material may discharge, the rods will at the same time be prevented from escape, because of their impossibility to assume such an inclined position as would be necessary for them to pass through said opening. In the particular example shown, the inner edge *o—x* of the flange falls abreast of and overlaps the outer edge *o—y* of the door. The pulp which builds up to the dotted line *x* indicated in Fig. 1 flows over the sloping edges of the flange 4 and liner 4' through the slot *o* into the launder 8 as indicated by the arrows. As stated above, the function of the door or guard 9 is to intercept any rod tending to precipitate out of the mill during the reducing operation; but the door may be swung open at any stage of the reducing operation to allow for the inspection of the mill contents, to make necessary repairs, and the like. The diameter of the door will necessarily depend on the width of the pulp up-building flange 4; and where such a flange is dwarfed or entirely absent (as may be the case in mills sufficiently pitched to dispense with the flange) the door is correspondingly enlarged, sufficient space being left however between the periphery of the door and the walls of the reducing compartment C to form an annular (or equivalent) slot or passage-way for the discharge of the material. Or, the door may be made large enough to entirely close the barrel opening and an interrupted annular (or equivalent) slot formed in the door at any desired pulp-line to permit the material to discharge therethrough.

The operation is the same as in all mills of the general type or class to which the present mill belongs. The mill or barrel is given a rotation in the direction indicated by the arrows in Fig. 1, the wall nearest the reader sweeping upward while the wall farthest away is descending. The reducing rods 1 tumble freely across the reducing compartment C, but since in their tumbling movements they are constantly being directed away from the discharge opening by the combined action of the pitch of the mill, and the inclined lifters, it follows that the rods will remain normally out of contact with the door or guard 9, but any rod which happens to strike the door 9 will of course necessarily be intercepted and prevented from falling out of the mill, it being noted that the inner surface of the guard is free of any obstacles to the tumbling movement of said rods. The impact of the rods against the door is however not frequent as the rods are in the main kept in the mill by the pitch of the mill, by the deflecting action of the lifters 3, and by the flange 4. The pulp enters the reducing compartment C through the hollow feed trunnion 5 and the finished product discharges as previously indicated, through the open discharge end of the mill.

The invention is obviously susceptible of a variety of modifications. Thus, in Figs. 3 and 4, is shown a mill or drum D' provided with a pulp up-building flange 20 formed with an outwardly flaring overflow lip 20' discharging into the launder 21, the pulp line $x$ being built up by the member 20 the same as in the form first described. In this case the door 9′ is preferably, though not necessarily, hinged to the lip 20′, an interrupted annular slot or pasage-way $o'$ being formed between the door and the flange the same as in the first form, the door being provided with a lug or arm 22 opposite its hinge axis which is secured to the lip 20′ by means of a cap-screw 23.

In Fig. 5 is shown a barrel or mill T provided at the discharge end with a frusto-conical flange 30 and a door 31 is preferably hinged thereto and is normally held fastened by a cap-screw $d$, an annular slot $i$ between the door periphery and inner edge of the flange being formed for the discharge of the material. The flange 30 is formed with a thickened portion 32 to afford support for the screw $d$.

In Fig. 6 is shown a barrel T the discharge end of which is provided with a combined plane and frusto-conical flange 33 and a door 34 is preferably hinged thereto, and is normally held fastened by a cap-screw $d$, an annular discharge slot $i'$ being formed between the periphery of the door and inner edge of the flange.

In Figs. 7 and 8 is shown a barrel, or mill T provided at its discharge end with a plane flange 35, within the confines of which is normally disposed a door 36, said door in this instance being readily detachable from the barrel to permit access to the interior of the barrel and is held in place while in service position, by the cap-screws $d$ passed through the opposite terminals of the central ribs $i''$ formed on the door. The annular slot $s$ between the door and flange allows for the flow of the pulp out of the barrel.

In all the forms above referred to, the discharge slot $o$ or its equivalent is formed around the door 9 or its equivalent, that is to say between the periphery of the door and the walls of the opening defined by the flange 4 or its equivalent (or the walls of the reducing compartment where the flange is absent). We may however, as examples of extreme modifications, locate the discharge slot either in the flange or in the door, in each of which cases the slot would still be between the walls of the reducing compartment and the center of the door as in the preceding forms. Thus in Figs. 9 and 10 is shown a barrel T the open end of which is provided with a flange 37 formed with an annular interrupted discharge slot $u$ at such a point as to raise the pulp line $x$ the desired degree, a hinged door 38 in this case closing the opening of the flange and being normally held locked by the cap-screw $d$. On the other hand, in Figs. 11 and 12 is shown a barrel T provided with a flange 39 at its open end, the opening defined by the flange being normally closed by the hinged door 40 in which at the proper pulp line is formed an annular interrupted discharge slot $w$, the door when closed being fastened by a cap-screw $d$ as shown. There are other modifications that are possible, but which need not be herein illustrated because readily suggesting themselves to the skilled mechanic. In all the forms described the door or rod-intercepting member or plate is disposed across the rotation axis of the mill or barrel, said axis passing preferably through the center of the door. In all the forms described the discharge slot ($o$, $o'$, $i$, $i'$, $s$, $u$, $w$,) conforms to the position desired for the pulp line, which, of course, may be raised or lowered according to circumstances, and according to conditions to be met with in practice. The lowest position for the pulp-line is reached when the flange 4 or its equivalent disappears. The present invention of course is not to be restricted in its application to mills with a pulp-line of the particular height indicated herein, but is to be understood as applicable to mills having any range of pulp-line positions from the lowest to the highest which may be tolerated in practice.

Due to the disposition of the discharge opening for the material, as shown in the various forms of the invention above described, wherein the material is permitted to flow from the reducing compartment directly through the discharge end of the same, the reducing rods may extend for substantially the full length of said compartment, so that the entire length of the compartment is available in the reducing action of the rods.

It will be observed that in the different embodiments of my invention as illustrated in the accompanying drawings, the passage-way for the discharge of the material is circumferential and is disposed between the wall of the tumbling barrel and center of the door and in such relation to the barrel that the discharge of the material from the barrel will be wholly within the limits of said wall. In some instances this passage-way is between the inner edge of an inwardly extending flange on the barrel and the outer edge of the door; in other instances the passage-way is through the flange; and in still other instances the passageway is through the door. Further it will be observed that the door while being attached to the barrel so as to rotate therewith, is capable of movement relatively to the barrel so that access may be gained to the interior of the barrel. It is not the intention that all of the claims be limited in respect to these enumerated characteristics, as certain of the claims are broader and do not depend for patentability on such characteristics, while others are more limited and include the same.

Features shown in the drawing but not alluded to are either well understood in the art, or form the subject-matter of other pending applications filed by me.

Having described my invention, what I claim is:

1. In a mill of the character described, a tumbling barrel having a feed end and a normally open discharge end, an inwardly projecting flange at the discharge end, the inner edge of the flange defining the available opening through which the material may flow, freely moving reducing bodies in the barrel, and a door or plate secured to the barrel having a maximum dimension less than the diameter of the opening aforesaid and adapted to be moved across said opening to form with the boundaries thereof an annular passageway for the direct discharge of the material.

2. In a mill of the character described, a tumbling barrel having a feed end and a normally open discharge end, an inwardly projecting flange at the discharge end, a door secured to the barrel and closing across the plane of disposition of the flange, a suitable passage-way being formed between the inner edge of the flange and the center of the door, for the direct discharge of the material.

3. In a mill of the character described, a tumbling barrel having an open discharge end surrounded by a flange operating to raise the pulp line, and provided with an outwardly flaring lip leading from the inner edge of the flange, and a door or movable plate cooperating with the lip and forming therewith an annular passage-way for the discharge of the material.

4. In a mill of the character described, a tumbling barrel having a feed end and a discharge end, and provided with a reducing compartment adapted to contain freely movable reducing rods, and a rod intercepting guard secured to the barrel and disposed across the discharge end and movable relatively to the same, the inner surface of said guard being free of any obstacles to the movement of said rods, a suitable slot being formed between the wall of the tumbling barrel and the center of the door and extending circumferentially of the barrel for the direct discharge of material.

5. In a mill of the character described, a tumbling barrel having a feed end and a discharge end and provided with a reducing compartment adapted to contain freely movable reducing rods, and a rod-intercepting guard closing across the discharge end of the barrel and adapted to be moved at will to a position to permit access to said reducing compartment, the inner surface of said guard being free of any obstacles to the movement of said rods, a suitable passageway being formed between the wall of the tumbling barrel and the center of the guard, and so formed and disposed as to effect the direct discharge of material from the crushing compartment wholly within the limits of the wall of the barrel, the said guard, when in position across the discharge end of the barrel, serving to prevent the accidental escape of the reducing rods therefrom.

6. In a mill of the character described, a tumbling barrel having a feed end and a discharge end, the latter being provided with a frusto conical wall defining an opening, and a guard closing across said opening, a suitable passageway being formed between the peripheral wall of the barrel and the center of the guard and so disposed and formed as to effect the direct discharge of material from the barrel wholly within the limits of said peripheral wall.

7. In a mill of the character described, a rotatable barrel having a feed end and a discharge end and adapted to contain longitudinally extending, loose, freely movable, reducing rods, and a rod-intercepting guard at the discharge end for preventing the accidental escape of the reducing rods from the barrel, said guard being spaced radially from the peripheral wall of the barrel to provide a discharge opening through the discharge end for effecting the direct discharge of material from the mill.

8. In a rod mill, a rotatable barrel having a feed end and a discharge end and provided with a reducing compartment having a discharge opening at the discharge end which is open for effecting the discharge of material from the reducing compartment while the machine is in operation, longitudinally extending loose freely movable reducing bodies in said compartment removable through the discharge end of the barrel and a rod intercepting guard at the discharge end of the barrel adapted to prevent the accidental escape of the reducing bodies from the reducing compartment, said guard being freely removable to permit access to the interior of the reducing compartment without freeing the reducing bodies.

9. In a mill of the character described, a rotatable barrel having a feed end and a discharge end and provided with a reducing compartment having a discharge opening, the inner limits of one edge of said opening being abreast of the outer limits of the other edge of said opening.

10. In a mill of the character described, a rotatable barrel having a feed end and a discharge end and provided with a reducing compartment having a discharge opening with overlapping edges.

11. In a mill of the character described, a rotatable barrel having a feed end and a discharge end and provided with a reducing compartment having a discharge opening in the form of an inclined passageway having opposed substantially parallel inclined walls formed to effect the direct discharge of material from the mill.

12. In a mill of the character described, a rotatable barrel having a feed end and a discharge end and provided with a reducing compartment having an annular circumferential discharge opening with an outwardly flaring flange around the same formed to effect the direct discharge of material from the mill.

In testimony whereof, I have affixed my signature hereto.

FRANK E. MARCY.